United States Patent [19]

Bell

[11] Patent Number: 5,282,515

[45] Date of Patent: Feb. 1, 1994

[54] DRIVING ASSEMBLY FOR ATTACHMENT TO A TRAILER

[76] Inventor: George N. Bell, 322 Harrington Dr., Duncanville, Tex. 75116

[21] Appl. No.: 717,040

[22] Filed: Jun. 18, 1991

[51] Int. Cl.$^5$ .................................................. B62D 51/04
[52] U.S. Cl. ........................................ 180/11; 180/14.3
[58] Field of Search ................... 180/11, 12, 13, 14.2, 180/14.3, 16, 302, 305, 306; 114/344

[56] References Cited

U.S. PATENT DOCUMENTS

| | | |
|---|---|---|
| 3,439,764 | 4/1969 | Kimball . |
| 3,568,624 | 3/1971 | Bjorklund .................. 114/344 X |
| 3,705,638 | 12/1972 | Shock . |
| 3,770,070 | 11/1973 | Smith ................................ 180/13 |
| 3,783,960 | 1/1974 | Feliz ................................ 180/14.2 |
| 3,861,482 | 1/1975 | Stephens et al. ............... 180/13 |
| 3,865,204 | 2/1975 | Bueckner, Sr. . |
| 3,942,823 | 3/1976 | Shields et al. ................. 180/11 X |
| 4,162,711 | 7/1979 | Cornelius . |
| 4,210,217 | 7/1980 | Lachowicz . |
| 4,860,841 | 8/1989 | Sacco . |

Primary Examiner—Joseph D. Pape
Attorney, Agent, or Firm—Richards, Medlock & Andrews

[57] ABSTRACT

The invention is a driving assembly that can be attached to an existing trailer, manufactured with the trailer, or retrofitted onto a trailer in place of the front part of the trailer. The driving assembly comprises a housing attached to the trailer with a column disposed vertically through the housing. A cranking assembly engages the column and can vertically move the column. At least one drive wheel is attached to the column and is engageable with the ground. A hydraulic motor mounted on the wheel propels the trailer. A platform around the housing allows for the operator to be on the trailer while driving the trailer to impart weight to the drive wheel to increase traction.

2 Claims, 1 Drawing Sheet

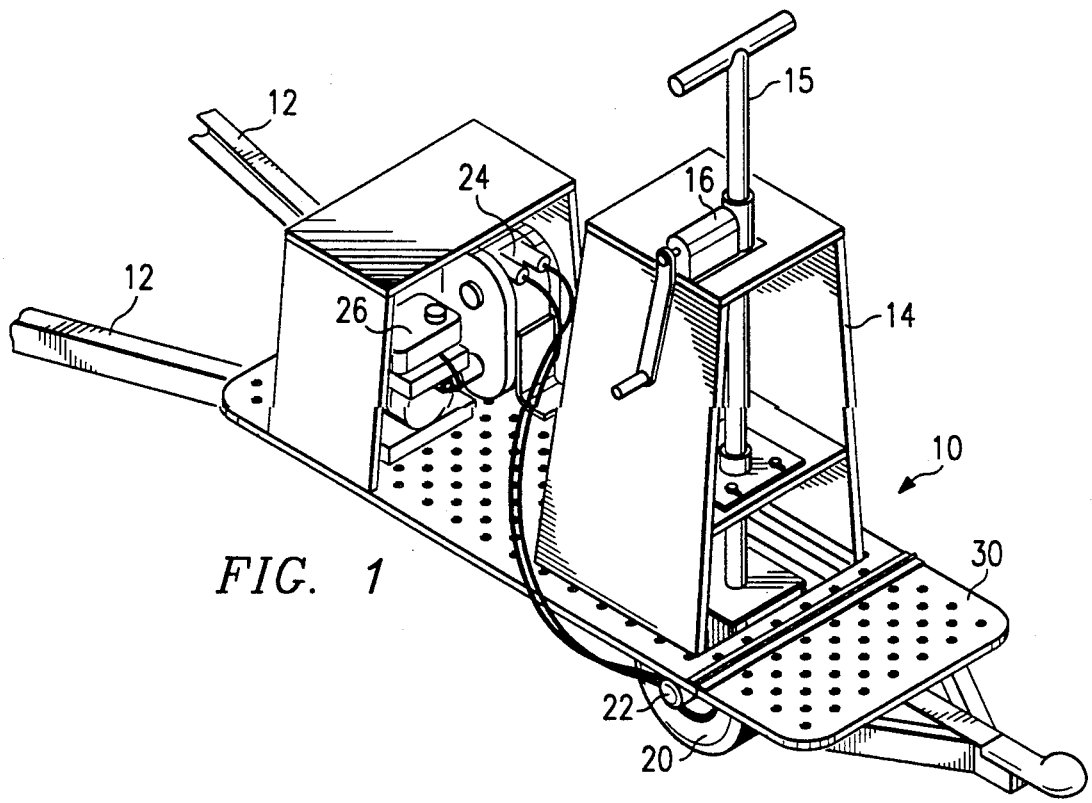
FIG. 1
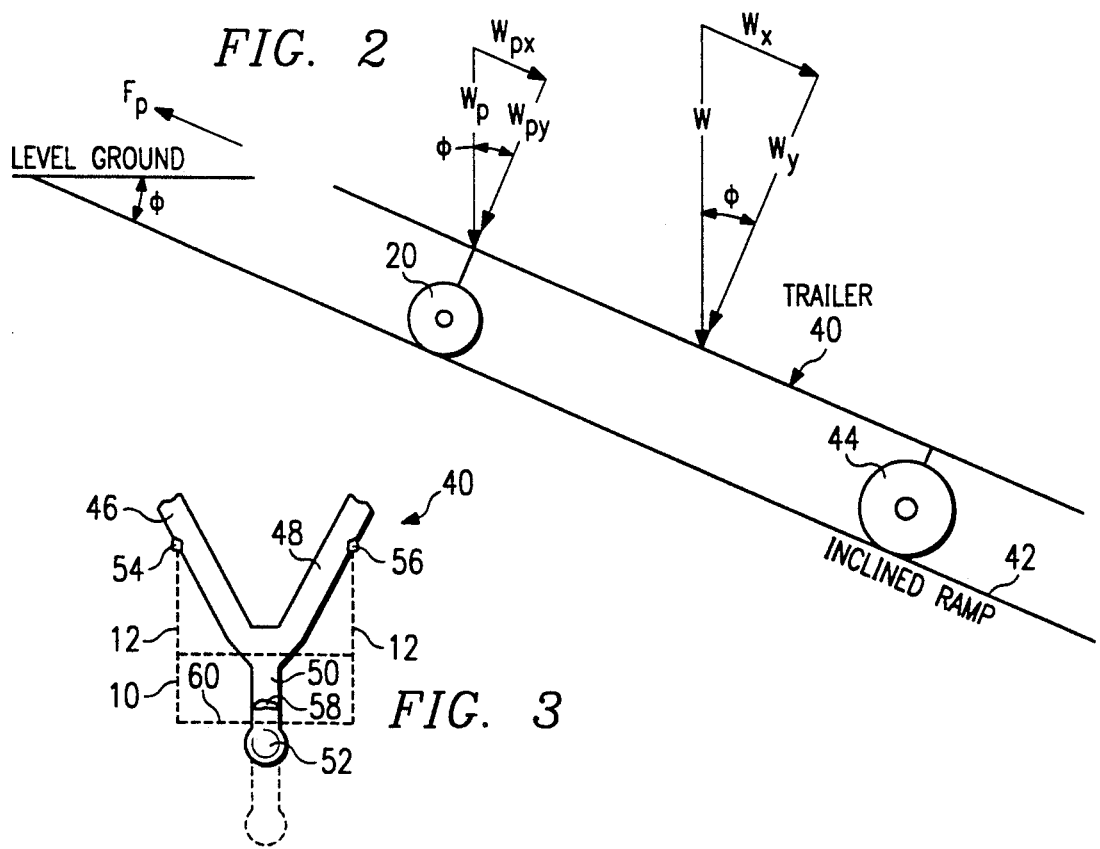
FIG. 2
FIG. 3

DRIVING ASSEMBLY FOR ATTACHMENT TO A TRAILER

TECHNICAL FIELD OF THE INVENTION

This invention relates to a driving assembly attachable to a trailer, and in particular, to such an assembly whereby the trailer is drivable independent of a towing vehicle.

BACKGROUND OF THE INVENTION

Launching and retrieving a boat at a boat ramp involves the difficult and cumbersome task of backing up a trailer attached to a towing vehicle. Often boat ramps are crowded and such maneuvering becomes even more burdensome. Also in many instances the rear wheels of a towing vehicle are exposed to the water which is undesirable. Also, to be able to launch and retrieve a trailer fully loaded requires a towing vehicle with sufficient power. If the towing vehicle does not have sufficient power, the launching and retrieving of a trailer can damage the towing vehicle.

Power dollies exist that can be attached to the hitch of a trailer but this involves the cumbersome task of stowing the dolly and attachment and disengagement of the dolly with the trailer. Other devices which are attachable to the draw bar of the trailer such as U.S. Pat. No. 4,860,841 to Sacco and U.S. Pat. No. 3,783,960 to Feliz are designed for maneuvering mobile home type trailers in a relatively small area and cannot propel a trailer up and down an inclined boat ramp. U.S. Pat. No. 3,861,482 to Stephens et al. shows a driving assembly which is attached to the draw bar of a trailer which is offset to the side and requires the operator to walk along side the trailer during operation. From the disclosure of the Stephens et al. patent it is not clear that the device is capable of propelling a loaded trailer up and down a ramp. Also, the driving means for the wheel is not submersible and thus the trailer could not be fully backed into the water. Even if the device could go under water the operator would have to walk into the water.

There exists a need for an assembly that can be attached to a trailer which enables the operator to be on the trailer while driving the trailer to impart weight to the drive wheel to increase traction. A need also exists for an assembly that can be attached and allow the trailer to be fully backed into the water. There is a need for an assembly that can be manufactured with a trailer or retrofitted onto a trailer. Such a device would be integral with the trailer and hitchable to a towing vehicle for travel over long distances. However, once at a ramp or other desired drop off area, the trailer is completely drivable independent of the towing vehicle and without the operator having to walk alongside the trailer.

SUMMARY OF THE INVENTION

The present invention is a driving assembly attachable to a trailer whereby the trailer is drivable independent of a towing vehicle. In one aspect of the invention the driving assembly comprises a housing attachable to the draw bar of the trailer. A column is rotatably and vertically disposed through the housing and a cranking assembly is attached to the housing that engages with the column and can vertically move the column through the housing. At least one drive wheel is rotatably attached to the bottom of the column and engagable with the ground. A submersible driving means is operatively connected to the drive wheel to rotate the drive wheel and thereby propel the trailer. A platform is attached to the trailer around the housing and dimensioned such that a human operator can be on a trailer to drive the trailer and impart weight to the drive wheel to increase the traction between the drive wheel and the ground. Alternatively, or in supplement of, other weights such as bricks, sand or water can be added to impart additional weight on the drive wheel.

In another aspect of the invention, the driving assembly comprises a housing attachable to the draw bar of the trailer. A column is rotatably and vertically disposed through the housing and a cranking assembly is attached to the housing that engages the column and can vertically move the column through the housing. At least one drive wheel is rotatably attached to the bottom of the column. A submersible hydraulic motor is mounted onto the housing and operatively connected to the drive wheel to rotate the wheel and propel the trailer. A hydraulic pump is mounted on the trailer and operatively connected to the hydraulic motor. An engine is mounted to the trailer and operatively connected to the hydraulic pump.

In yet another aspect of the invention, a driving assembly is provided that replaces the front of a trailer comprising a frame adapted to attach to a trailer in place of the front part of the trailer. A housing is attachable to the frame. A column is rotatably and vertically disposed through the housing and a cranking assembly is attached to the housing that engages the column and can vertically move the column through the housing. At least one drive wheel is rotatably attached to the bottom of the column and engageable with the ground. A submersible driving means is operatively connected to the drive wheel to rotate the drive wheel and thereby propel the trailer.

BRIEF DESCRIPTION OF THE DRAWINGS

For a more complete understanding of the present invention and for further advantages thereof, reference is now made to the following description to the preferred embodiment taken in conjunction with the accompanying drawing, in which:

FIG. 1 is a perspective view of the preferred embodiment of the present invention;

FIG. 2 is a representation of the forces acting on a trailer on a sloped surface; and FIG. 3 is a schematic view of one installation of the present invention on a trailer.

DETAILED DESCRIPTION

Referring to FIG. 1, reference numeral 10 generally identifies the preferred embodiment of the driving assembly, incorporating all aspects of the present invention. Driving assembly 10 comprises a frame 12 that is adaptable to attach to a trailer in place of the front part of the trailer. However, another aspect of the invention is that the driving assembly can be attached onto the front of a trailer without having to remove the front of the trailer, in which case frame 12 would not be required. So reference numeral 12 can refer to the front of a trailer, in which case the rest of the trailer is not shown in FIG. 1.

Attached to frame 12 is housing 14. Housing 14 can be constructed out of any suitable material. Column 15 is rotatably and vertically disposed through housing 14.

Cranking assembly 16 attached to said housing engages column 15 and can move column 15 vertically. The preferred cranking assembly is a handle and gear which engages a rack on the column. At least one drive wheel 20 is rotatably attached to the bottom of said column 15 and is engagable with the ground. In one aspect of the invention, a submersible hydraulic motor 22 is mounted on the housing and operatively connected to said wheel. However, other means to drive the wheel can be used so long as the parts of the drive means below frame 12 are submersible. Hydraulic pump 24 is located above frame 12 and is operatively connected to hydraulic motor 22. Engine 26 is located above frame 12 and is operatively connected to hydraulic pump 24. Engine 26 can be a gas engine, electric motor, or any other suitable power source. In one aspect of the present invention, platform 30 is around housing 14 and dimensioned such that a human operator can be on said trailer to drive said trailer and impart weight to drive wheel 20 to increase the traction between drive wheel 20 and the ground. Since the operator can drive the trailer while being on the trailer the operator does not have to walk along the boat and possibly into water when launching or retrieving a boat at a boat ramp. It should be understood, however, that the weight added to platform 30 or proximate drive wheel 20 to urge drive wheel 20 with greater force against the ground can be bricks, concrete blocks, a drum filled with water or sand, or any other suitable weight.

Reference is now made to FIG. 2, which illustrates the forces acting between trailer 40 and a ramp 42 inclined at an angle $\phi$. Ramp 42 could, for example, be a boat ramp. The trailer 40 is supported on the ramp through drive wheel 20 and the road wheels 44. The total weight of the trailer is W, and is represented in FIG. 2 by a force vector through the center of gravity of the trailer. The force vector W can be represented as the combination of force vector $W_x$, parallel the ramp surface, and force vector $W_y$, perpendicular the ramp surface. Force $W_x$ must be at least counteracted by the force $F_p$ to prevent the trailer from rolling downhill, and $F_p$ must exceed $W_x$ to pull the trailer up the ramp.

The weight of the trailer acting through the drive wheel 20 is $W_p$, which can also be represented by force vector $W_{px}$ parallel the ramp surface and force vector $W_{py}$ perpendicular the ramp surface. D.O.T. and A.S.M.E. standards for trailers state that the weight over the tongue, or $W_p$, should be about 15% of the total weight of the trailer W for normal trailer operation.

In such a trailer, if drive wheel 20 is powered to create force $F_p$, $F_p$ would be limited to 15 $\mu W \cos \phi$, where $\mu$ is the coefficient of friction between the drive wheel 20 and ramp surface. Thus, if no weight is added to platform 30, $F_p$ is determined solely by $\mu$ (the coefficient of friction), approximately 0.15 W (where W is the total weight of the trailer), and the ramp angle on which it operates. However, by adding weight to the trailer proximate wheel 20, and therefore increasing $W_p$, $F_p$ is correspondingly increased and the driving assembly will operate effectively on any reasonable slope ramp and on any type of surface, even if slippery.

With reference now to FIG. 3, other advantages of the present invention will be described. The typical trailer, such as trailer 40, has two beams or channel members 46 and 48 which converge at a tongue 50. At the front of tongue 50 is the hitch 52. In one design of driving assembly 10, seen in FIG. 3, the hitch 52 is cut off the trailer along line 60. Driving assembly 10 is welded to the trailer at three separate points to provide a secure attachment. One leg 12 is welded to member 46 at weld 54. The other leg 12 is welded to member 48 at weld 56. The third weld 58 is made between the tongue 50 of the trailer and the assembly. The design makes it quite easy to mount assembly 10 on any trailer, whether originally designed for use with assembly 10 or not.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A driving assembly attachable to a trailer, the trailer for use on a highway, comprising:
   a) A housing attachable to the front of said trailer;
   b) A column rotatably and vertically disposed through said housing;
   c) A cranking assembly attached to said housing that engages said column and can vertically move said column through said housing;
   d) At least one drive wheel rotatably attached to the bottom of said column and engageable with the ground;
   e) A submersible driving means mounted on said trailer and operatively connected to said drive wheel to rotate said drive wheel thereby propelling said trailer, said driving means being a hydraulic motor operatively mounted to said drive wheel;
   f) A platform around said housing dimensioned such that a weight can be placed on said trailer proximate said drive wheel to increase traction between said drive wheel and the ground, said driving assembly permitting use of the trailer on the highway;
   the trailer having a first beam and a second beam which converge to a tongue, a hitch mounted on the tongue, the driving assembly being welded to each of said beams and said tongue.

2. The driving assembly of claim 1 wherein the driving assembly further includes a hitch mounted on the driving assembly to replace the hitch of the trailer.

* * * * *